United States Patent
Stevens et al.

(10) Patent No.: US 7,025,260 B1
(45) Date of Patent: Apr. 11, 2006

(54) METHOD AND SYSTEM FOR PERMITTING LIMITED USE OF AN IMAGING DEVICE

(75) Inventors: Chad A. Stevens, Boise, ID (US); James F. Gutierrez, Boise, ID (US); Robert Sesek, Boise, ID (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 11/118,202

(22) Filed: Apr. 28, 2005

(51) Int. Cl.
*G06K 5/00* (2006.01)

(52) U.S. Cl. ...................... 235/382; 700/237
(58) Field of Classification Search ............... 235/382
See application file for complete search history.

(56) References Cited

U.S. PATENT DOCUMENTS

| | | | |
|---|---|---|---|
| 6,314,521 B1 | 11/2001 | Debry | |
| 6,583,888 B1 | 6/2003 | Salgado et al. | |
| 6,618,806 B1 | 9/2003 | Brown et al. | |
| 2001/0025348 A1 | 9/2001 | Takaragi | |
| 2002/0016922 A1 | 2/2002 | Richards et al. | |
| 2002/0062453 A1 | 5/2002 | Koga | |
| 2002/0184539 A1 | 12/2002 | Fukuda et al. | |
| 2003/0223363 A1 | 12/2003 | Sato | |
| 2004/0021890 A1 | 2/2004 | Hirai et al. | |
| 2004/0114175 A1* | 6/2004 | Cherry et al. | 358/1.15 |
| 2004/0233471 A1 | 11/2004 | Inoue et al. | |
| 2004/0244031 A1* | 12/2004 | Martinez | 725/25 |
| 2005/0018237 A1 | 1/2005 | Cossel et al. | |
| 2005/0045732 A1* | 3/2005 | Whitaker | 235/493 |
| 2005/0076220 A1* | 4/2005 | Zhang et al. | 713/176 |

* cited by examiner

*Primary Examiner*—Karl D. Frech
*Assistant Examiner*—Kristy A. Haupt

(57) ABSTRACT

A method for permitting the limited use of a multifunction imaging device includes the multifunction imaging device scanning indicia printed on a media. The method also includes converting the indicia to at least one function identifier and a corresponding instruction associated with the at least one function wherein, the instruction informs the imaging device of the limitations in the use of the at least one function.

22 Claims, 3 Drawing Sheets

METHOD AND SYSTEM FOR PERMITTING LIMITED USE OF AN IMAGING DEVICE

BACKGROUND OF THE INVENTION

In many office environments, there is a need to control and monitor costs associated with the use of printing and copying devices. Thus, many enterprises establish an "access list" that controls access to a particular resource and allows printing and copying costs to be associated with a particular employee or with a particular project with which the employee is associated. This allows the enterprise to accurately bill the client or customer for the costs associated with producing printed materials. However, the use of an access list requires an administrator to periodically modify and update the list as employees move within the enterprise as well as when new projects are initiated and other projects are completed. In many instances, the administrator can spend a significant amount of time updating and modifying the access list in response to these changes.

In larger enterprises, the problem may be even more acute. For example, when an employee from one facility travels to another facility, he or she may require access to printing and copying devices at the new facility for only a short period of time, such as one or two days. In these instances, the traveling employee may be added to the access list at the beginning of the week and removed from that access list later that same week. In another example, such as in a hotel setting, a guest may require the use of printing and imaging devices at the hotel's "business center" for perhaps only a few hours. In these instances, both the enterprise and the hotel can benefit from associating printing and copying costs with a particular individual without requiring an administrator to modify the access list when the user begins and ends his or her visit.

DESCRIPTION OF THE EMBODIMENTS

A method and system for permitting limited use of a multifunction imaging device as presented in the embodiments herein allows a user to quickly access the imaging device and make limited use of the device in accordance with predetermined usage rules. For example, a hotel may allow guests to print or copy a predetermined number of pages during their stay, while prohibiting the use of the imaging device after a guest's stay has ended. In another example, a first department within a commercial enterprise may allow employees from other departments to make use of imaging devices owned by the first department only during normal working hours. In a related example, an employee from one department may be allowed access to the imaging devices that are owned by another department only up to a predetermined number of copied or printed pages.

Figure 1:
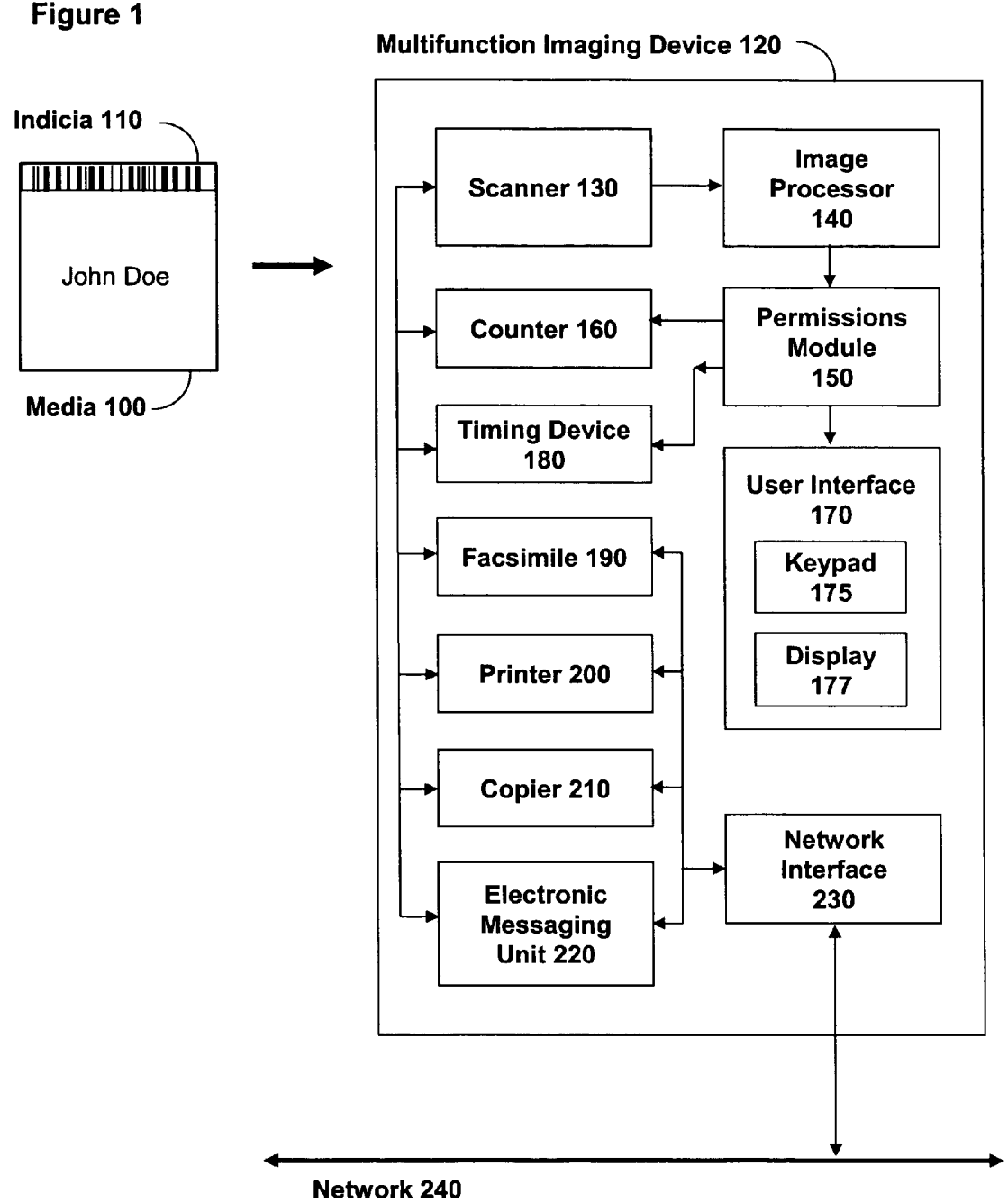
FIG. 1 is a block diagram of a stand-alone system for permitting limited use of a multifunction imaging device according to an embodiment of the invention.

FIG. 1 is a block diagram of a stand-alone system for permitting limited use of multifunction imaging device 120 according to an embodiment of the invention. In FIG. 1, media 100 includes indicia 110 as well as an individual's name (John Doe) having some level of privilege in operating multifunction imaging device 120. Perhaps this privilege emanates from John Doe being a guest at hotel that owns the imaging device 120, or perhaps John Doe is an employee of an enterprise that owns the imaging device, but is not on the access list of users that have unlimited use of imaging device 120.

In the context of the present invention, a broad definition of the term "media" is contemplated. Thus, in one embodiment, media 100 is a single piece of paper. In another embodiment, media 100 is the reverse side of an employer-issued identification badge. This may be especially useful in secure environments where registered documents are kept and only certain employees are allowed to make copies according to strict security policies. In still another embodiment, the media can be a user's electronic room key issued by a hotel, at which the user is a current guest. Also in the context of the present invention, the term "indicia" is contemplated as including a broad array of machine readable markings. This includes one or two-dimensional barcodes, watermarks, and other indicators that can be used to encode at least one function identifier and at least one corresponding instruction that limits the use of the function (as described below).

In FIG. 1, when the user (John Doe) wishes to begin using multifunction imaging device 120, he scans media 100 using scanner 130 of the imaging device. When media 100 is scanned, the indicia (110) printed on the media is converted by image processor 140 into a set of function identifiers and instructions associated with each function identifier. These instructions convey the user's permissions corresponding to the functions performed by the particular multifunction imaging device. For example, the user (John Doe) may be permitted to print or copy 100 pages of documents in a given day. In another example, the user may be able to use the multifunction imaging device only during the hours of 8:00 in the morning until 5:00 in the afternoon. In yet another example, the user may only be able to print or copy documents using printer 200 and copier 210 during certain hours, while being allowed to make use of electronic messaging unit 220 until much later, such as 10:00 in the evening.

In FIG. 1, image processor 140 conveys a set of function identifiers and instructions associated with each function identifier to permissions module 150. Permissions module 150 includes an interface to counter 160 and to timing device 180. In the embodiment of FIG. 1, counter 160 controls and tracks a number of documents that the user may transmit or receive via facsimile (by way of facsimile 190), print (by way of printer 200), and copy (by way of copier 210). Counter 160 also controls and tracks the number of documents the user can electronically mail using electronic messaging unit 220 by way of network interface 230 and network 240. This includes transmitting electronic documents to another user, transmitting electronic documents to a workflow, transmitting electronic documents to an electronic folder, or performing any other electronic document transmission function by way of electronic messaging unit 220.

Permissions module 150 also interfaces with timing device 180, which controls and tracks the time of day during which the user may make use of the functions performed by multifunction imaging device 120, such as from 8:00 am until 5:00 pm. Timing device 180 may also track relative time, thus permitting the user to copy or perform other imaging functions for a certain period of time after scanning media 100. For example, the user may be permitted to make use of one or more functions of multifunction imaging device 120 for a period of two hours after indicia 110 is scanned.

Thus, in the system of FIG. 1, limitations on the functions performed by multifunction imaging device 120 can be expressed by way of document or pages that the user can print, copy, scan, and so forth, or by way of allowing the user to make use of one or more functions during certain times of the day, or by way of allowing the user to use one or more functions for a relative time period. Further, nothing prevents indicia 110 from encoding limitations that include more than one type of use limitation. Thus, for example, indicia 110 may convey a function identifier and corresponding instruction that limits the number of documents that the user may print to 50 pages. The indicia may also convey a function identifier and corresponding instruction that limits the time of day that the user may make copies to between the hours of 8:00 am to 5:00 pm. The indicia may also convey a function identifier and corresponding instruction that limits electronic mailing (i.e. performing any electronic document transmission function) to a 24 hour period after the media has been scanned.

Multifunction imaging device 120 also includes user interface 170 coupled to permissions module 150. This allows display 177 to display an access code after the user (John Doe) scans media 100 using scanner 130. In this embodiment, the displayed access code represents indicia 110 to imaging device 120. Thus, when the user returns to multifunction imaging device 120, perhaps a short time later, the user need only input the previously-displayed access code (using keypad 175) in order for multifunction imaging device 120 to re-establish the limitations associated with the user. The user may then resume copying, scanning, facsimile transmission and reception, and so forth until the predetermined limits on these functions have been reached.

In another embodiment of the invention, user interface 170 may include a biometric identification device, such as a fingerprint scanner, thumbprint scanner, or other device that authenticates the user based on one or more biological properties. In such an embodiment, the user places his or her thumb or finger at an appropriate location on user interface 170 in lieu of entering information via keypad 175. In response, multifunction imaging device 120 re-establishes the limitations associated with the user according to limitations encoded in indicia 110.

Figure 2:
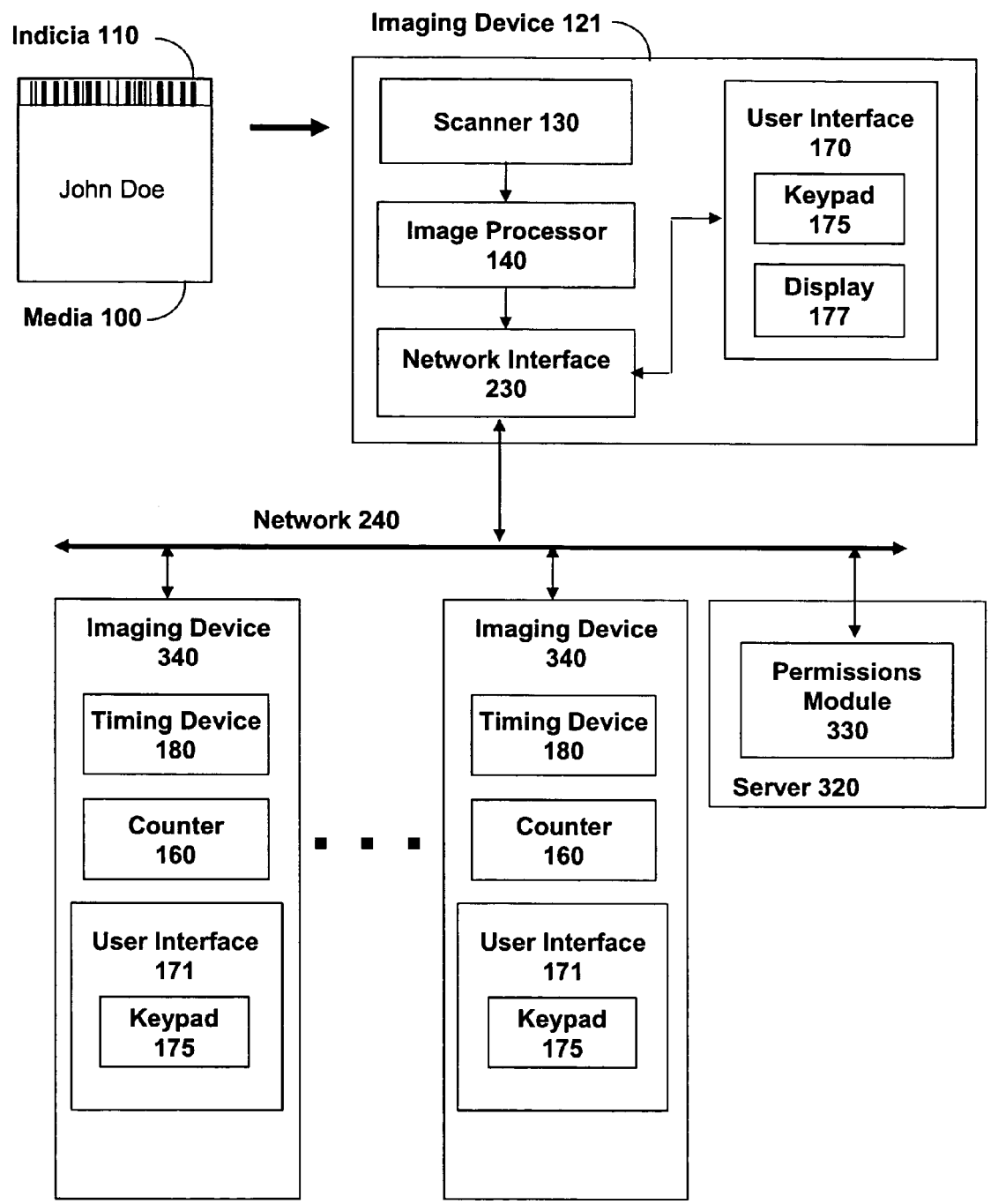
FIG. 2 is a block diagram of a distributed system for permitting limited use of an imaging device according to an embodiment of the invention.

FIG. 2 is a block diagram of a distributed system for permitting limited use of an imaging device according to an embodiment of the invention. In FIG. 2, many of the functional components of multifunction imaging device 120 (of FIG. 1) have been distributed into separate, perhaps more specialized equipment. However, media 100 and indicia 110 printed thereon remain unchanged from FIG. 1.

In FIG. 2, media 100 is scanned by the user (John Doe) using scanner 130 of imaging device 121. Image processor 140, coupled to scanner 130, translates the information encoded in the indicia into at least one function identifier and at least one corresponding instruction that limits the use of the function. In a manner that accords with the system of FIG. 1, these functions may be one or more of copying, printing, scanning, facsimile transmission and reception, electronic messaging (including transmitting electronic documents to another user, transmitting electronic documents to a workflow, transmitting electronic documents to an electronic folder, or performing any other electronic document transmission).

After the user scans media 100, the function identifiers and corresponding instructions are conveyed through network interface 230 to permissions module 330 resident in server 320. Permissions module 330 then generates an access code that the user can input later in order to use one or more of the imaging devices under the control of server 320. As is the case for the system of FIG. 1, this allows the user to operate an imaging device within the predetermined limits without requiring the user to re-scan media 100 every time the user needs to print, copy, scan, and so forth. Display 177 of user interface 171 is used to display the access code, while keypad 175 accepts the code when the user returns to imaging device 121.

Imaging device 340 represents any imaging device, such as a printer, copier, scanner, or facsimile device. Further, multiple imaging devices 340 may be interfaced with network 240 and under the control of server 320. In the embodiment of FIG. 2, each of imaging devices 340 includes a timing device 180 for tracking an absolute time (such as 8:00 am until 5:00 pm) during which the user may make of the imaging device and for tracking a relative time (such as two hours from the time the user scans media 100) during which the user may operate the imaging device. Counter 160, included within each of imaging devices 340, tracks the number of documents printed, copied, scanned, and so forth up to the user's predetermined limits. Each of imaging devices 340 includes a keypad 175 that accept the code displayed to the user by way of display 177.

Figure 3:
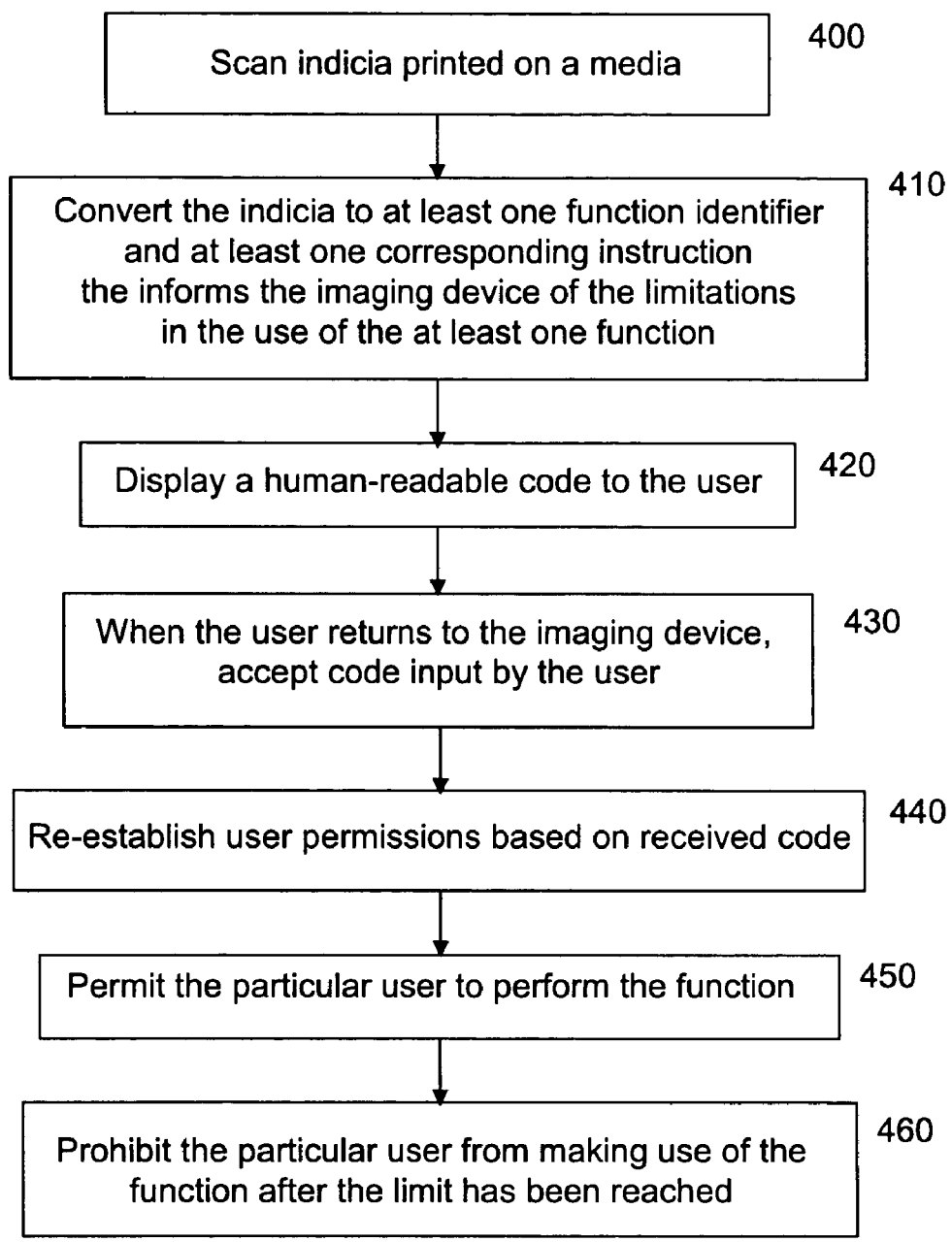
FIG. 3 is a flowchart for a method for permitting the limited use of a multifunction imaging device according to an embodiment of the invention.

FIG. 3 is a flowchart for a method for permitting the limited use of a multifunction imaging device according to an embodiment of the invention. The apparatus of FIG. 1 or FIG. 2 are suitable for performing the method of FIG. 3, although other systems or equipment arrangements may be used as well. The method of FIG. 3 begins at step 400 in which the user (such as John Doe) scans indicia printed on a media. The media may be a piece of paper or may be the reverse side of an employer-issued identification badge. In another embodiment of the invention, the media can be a user's electronic room key issued by a hotel, at which the user is currently a guest.

At step 410, the scanned indicia are converted to at least one function identifier and at least one corresponding instruction that informs the imaging device of the limitations in the use of the at least one function. These limitations may pertain to a number of documents the user may print, copy, scan, transmit via facsimile, or email (which includes transmitting electronic documents to another user, transmitting electronic documents to a workflow, transmitting electronic documents to an electronic folder, or performing any other electronic document transmission). In alternate embodiments, these limitations may pertain to an absolute or relative time periods during which the user can operate the imaging device.

At step 420, a human-readable code is generated and displayed to the user. In the embodiment of FIG. 3, the human readable code corresponds to the scanned indicia and identifies the user to the imaging device for subsequent use. Thus, when the user returns to the device, as in step 430, the imaging device can re-establish the permissions based on the received code, as in step 440. In response to the user entering the code (step 440), or scanning the indicia (of step 400), step 450 is performed in which the user is permitted to perform one or more imaging functions. In an alternate embodiment, the user may place his or her thumb or finger on a biometric scanner in order to re-establish the permissions in lieu of entering the code at step 440.

When the user has expended all of his or her allocation associated with a particular function, step 460 is performed in which the imaging device prohibits the user from using the particular function. In one embodiment, step 460 is performed when the user has reached his or her limit on the number of documents printed, copied, scanned, and so forth. In another embodiment, step 460 is performed when an absolute time has passed (such as 5:00 PM) or when a relative time has elapsed (such as two hours from the time the user scanned the indicia).

Some embodiments of the invention may include only a subset of the steps of FIG. 3. Thus, in one embodiment, a method for permitting the limited use of a multifunction imaging device may comprise the scanning indicia printed on a media (step 400) and converting the indicia to at least one function identifier and a corresponding instruction associated with the at least one function wherein the instruction informs the imaging device of the limitations in the use of the at least one function (step 410). Another embodiment of the invention may include only the steps of scanning a media having indicia printed thereon (400), converting information encoded in the indicia into at least one instruction associated with at least one function performed by the multifunction imaging device (410), permitting the particular user to perform the at least one function (450), and prohibiting the particular user from making use of the at least one function after the limit has been reached (460).

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method for permitting the limited use of a multifunction imaging device, comprising:
   the multifunction imaging device scanning indicia printed on a media; and
   converting the indicia to a plurality of function identifiers and a plurality of instructions, wherein each one of the plurality of instructions corresponds to one of the plurality of function identifiers, and wherein a first one of the plurality of instructions informs the multifunction imaging device of a limitation on a first function, and wherein a second one of the plurality of instructions informs the multifunction imaging device of a limitation on a second function, wherein
   the limitation on the first function pertains to a duration that the first function will operate for a user, and wherein
   the limitation on the second function pertains to a second duration that the second function will operate for the user.

2. The method of claim 1, wherein the media is paper.

3. The method of claim 2, wherein the indicia is a bar code printed on the paper.

4. The method of claim 1, wherein the limitations in the use of at least one of the first and second functions pertains to permitting a particular user to copy a document.

5. The method of claim 1, wherein the limitations in the use of at least one of the first and second functions pertains to permitting a particular user to electronically mail an electronic version of a document.

6. The method of claim 1, wherein the limitations in the use of the at least one of the first and second functions pertains to permitting a particular user to print a document.

7. The method of claim 1, wherein the limitations in the use of the at least one of the first and second functions pertains to permitting a particular user to transmit via facsimile.

8. The method of claim 1, wherein the limitation on the first function pertains to a number of copies that a user can make, and wherein the limitation on the second function pertains to a number of pages the user can transmit via facsimile.

9. The method of claim 1, further comprising the multifunction imaging device displaying a human-readable access code to a user.

10. A system that permits the limited use of an imaging device, comprising:
    a scanner for converting indicia printed on a media into an electronic representation of the indicia; and
    a permissions module for assigning limitations on the use of a first and second function of the imaging device based on the indicia, wherein
    the permissions module places a first limit on the use of the first function, and places a second limit on the use of the second function, and wherein
    the permissions module is coupled to a timing device, the timing device tracking a first time period and a second time period that is different from the first time period, the first and second time periods pertaining to the duration during which the first and second functions will operate for a particular user.

11. The system of claim 10, additionally comprising a display for displaying a code to a user, wherein the code represents the indicia printed on the media; and
    an input device that accepts a code from the user and limits the use of at least one of the first and second function of the imaging device based on the indicia printed on the media.

12. The system of claim 10, wherein the indicia is a bar code.

13. The system of claim 10, wherein the at least one of the first and second functions includes one or more of the group consisting of: the copying of a paper document, the electronic mailing of an electronic version of a document, the printing of a document, and the transmission of a facsimile document.

14. The system of claim 13, wherein the permissions module assigns limitations on the number of documents that can be electronically mailed, printed, transmitted via facsimile, copied, or scanned.

15. The system of claim 13, wherein the permissions module is coupled to a timing device, and wherein the timing device tracks a time period during which a user can perform at least one function.

16. The system of claim 10, wherein the permissions module is coupled to a counter, the counter tracking a first limit on the first function and a second limit on the second function, the first and second limits pertaining to the group consisting of: the number of documents that the user is permitted to copy, the number of documents that the user is permitted to print, the number of documents that the user is permitted to transmit via facsimile, the number of documents that the user is permitted to scan, and the number of documents that the user is permitted to email.

17. In a multifunction imaging device, a method for carrying out the limited use of a multifunction imaging device by a particular user, comprising:
scanning a media having indicia printed thereon;
converting information encoded in the indicia into a plurality of instructions and wherein a first instruction of the plurality of instructions pertains to a number of documents that can be printed by the particular user, and wherein a second instruction of the plurality of instructions pertains to a number of documents than can be copied by the particular user, and wherein the number of documents that can be printed by the particular user is different than the number of documents than can be copied by the particular user;
permitting the particular user to perform the at least one of the printing and copying functions; and
prohibiting the particular user from making use of the at least one of the printing and copying functions after the limit has been reached.

18. The method of claim 17, additionally comprising, prior to the permitting step, displaying a code that corresponds to the particular user.

19. The method of claim 18, additionally comprising accepting, by way of a user interface, a code that identifies the particular user to the multifunction imaging device.

20. The method of claim 17, wherein the at least one of the plurality of instructions conveys a relative time limit during which the particular user can perform the at least one of the printing and copying functions.

21. The method of claim 17, wherein the at least one of the plurality of instructions conveys an absolute time period, during which the particular user can perform the at least one of the printing and copying functions.

22. A multifunction imaging device comprising;
means for converting indicia printed on a document to at least one instruction, the indicia encoding a set of user permissions that pertain to the use of at least one function performed by the multifunction imaging device;
means for issuing an access code to the user that represents the user to the multifunction imaging device;
means for accepting an input from the user that corresponds to an access code; and
means for prohibiting the user from using the at least one function when a user permission of the set of user permissions has expired wherein
the set of permissions pertains to a time period, during which the user may operate the multifunction imaging device.

* * * * *

UNITED STATES PATENT AND TRADEMARK OFFICE
CERTIFICATE OF CORRECTION

PATENT NO. : 7,025,260 B1
APPLICATION NO. : 11/118202
DATED : April 11, 2006
INVENTOR(S) : Chad A. Stevens et al.

It is certified that error appears in the above-identified patent and that said Letters Patent is hereby corrected as shown below:

On the title page, Item (73), in "Assignee", line 2, delete "LP.," and insert -- L.P., --, therefor.

In column 6, line 9, in Claim 6, after "use of" delete "the".

In column 6, line 12, in Claim 7, after "use of" delete "the".

In column 7, line 18, in Claim 17, delete "than" and insert -- that --, therefor.

In column 8, line 10, in Claim 22, delete "comprising;" and insert -- comprising: --, therefor.

Signed and Sealed this

Twelfth Day of May, 2009

JOHN DOLL
*Acting Director of the United States Patent and Trademark Office*